(12) United States Patent
Cornelissen et al.

(10) Patent No.: US 9,493,602 B2
(45) Date of Patent: Nov. 15, 2016

(54) POLYURETHANER-BASED BINDER FOR PRODUCING CORES AND CASTING MOLDS USING ISOCYANATES CONTAINING A URETONIMINE AND/OR CARBODIIMIDE GROUP, A MOLD MATERIAL MIXTURE CONTAINING SAID BINDER, AND A METHOD USING SAID BINDER

(75) Inventors: Carsten Cornelissen, Duesseldorf (DE); Diether Koch, Mettmann (DE); Christian Priebe, Wuelfrath (DE)

(73) Assignee: ASK CHEMICALS GMBH, Hilden (DE)

( * ) Notice: Subject to any disclaimer, the term of this patent is extended or adjusted under 35 U.S.C. 154(b) by 276 days.

(21) Appl. No.: 13/988,067

(22) PCT Filed: Nov. 17, 2011

(86) PCT No.: PCT/DE2011/001996
§ 371 (c)(1),
(2), (4) Date: Jun. 13, 2013

(87) PCT Pub. No.: WO2012/097766
PCT Pub. Date: Jul. 26, 2012

(65) Prior Publication Data
US 2013/0248138 A1    Sep. 26, 2013

(30) Foreign Application Priority Data
Nov. 18, 2010   (DE) .................... 10 2010 051 567

(51) Int. Cl.
| | | |
|---|---|---|
| C08G 8/28 | (2006.01) | |
| B22C 1/22 | (2006.01) | |
| C08G 18/18 | (2006.01) | |
| C08G 18/54 | (2006.01) | |
| C08G 18/79 | (2006.01) | |
| C08K 3/36 | (2006.01) | |

(52) U.S. Cl.
CPC . *C08G 8/28* (2013.01); *B22C 1/22* (2013.01); *B22C 1/2253* (2013.01); *B22C 1/2273* (2013.01); *C08G 18/1891* (2013.01); *C08G 18/542* (2013.01); *C08G 18/797* (2013.01); *C08K 3/36* (2013.01)

(58) Field of Classification Search
None
See application file for complete search history.

(56) References Cited

U.S. PATENT DOCUMENTS

| | | |
|---|---|---|
| 3,409,579 A | 11/1968 | Robins |
| 3,485,797 A | 12/1969 | Robins |
| 3,905,934 A | 9/1975 | Gardikes |
| 4,268,425 A | 5/1981 | Gardikes |
| 4,546,124 A | 10/1985 | Laitar |
| 4,590,229 A | 5/1986 | Gardikes |
| 4,602,069 A | 7/1986 | Dunnavant |
| 5,447,968 A | 9/1995 | Barnett |
| 6,883,587 B2 | 4/2005 | Chen |
| 2003/0173055 A1* | 9/2003 | Chen et al. ............... 164/526 |

FOREIGN PATENT DOCUMENTS

| | | |
|---|---|---|
| EP | 0417600 | 10/1992 |
| EP | 1137500 | 12/2005 |

* cited by examiner

*Primary Examiner* — Mark Eashoo
*Assistant Examiner* — Chelsea M Christensen
(74) *Attorney, Agent, or Firm* — Standley Law Group LLP

(57) ABSTRACT

The present invention relates to a polyurethane-based binder using isocyanates containing uretonimine and/or carbodiimide groups for producing cores and casting molds, to a mold material mixture containing the binder, and to a method using the binder for producing casting molds.

20 Claims, No Drawings

POLYURETHANER-BASED BINDER FOR PRODUCING CORES AND CASTING MOLDS USING ISOCYANATES CONTAINING A URETONIMINE AND/OR CARBODIIMIDE GROUP, A MOLD MATERIAL MIXTURE CONTAINING SAID BINDER, AND A METHOD USING SAID BINDER

TECHNICAL FIELD

The present invention relates a polyurethane-based binder using isocyanates containing uretonimine and/or carbodiimide groups for producing cores and casting molds, to a mold material mixture containing the binder, and to a method using the binder for producing casting molds.

BACKGROUND OF THE ART

The method of producing cores that became known by the name of "Cold Box method" or "Ashland method" has attained great significance in the foundry industry. To this end, two-component polyurethane systems are employed for binding a refractory mold base material. The polyol component is composed of a polyol comprising at least two OH groups per molecule, the isocyanate component is composed of a diisocyanate/polyisocyanate comprising at least two NCO groups per molecule. The binder is cured with the aid of basic catalysts. Liquid bases can be admixed to the binder prior to molding so as to cause the two components to react with each other (U.S. Pat. No. 3,676,392). Another option is that of conducting gaseous tertiary amines through the mold material/binder mixture after shaping (U.S. Pat. No. 3,409,579).

According to U.S. Pat. No. 3,676,392 and U.S. Pat. No. 3,409,579, phenolic resins are used as polyols, which are obtained by condensing phenols with aldehydes, preferably formaldehyde, in the liquid phase at temperatures up to approximately 130° C. in the presence of catalytic concentrations of metal ions.

U.S. Pat. No. 3,485,797 describes the production of such phenolic resins in detail. In addition to unsubstituted phenol, it is possible to use substituted phenols, preferably o-cresol and p-nonyl phenol (see, for example, U.S. Pat. No. 4,590,229). According to EP 0177871 A2, aliphatic monoalcohol groups containing phenolic resins modified with one to eight carbon atoms can be used as another reaction component. Alkoxylation is intended to give the binders increased thermal stability.

The solvents that are used for the polyol component are primarily mixtures of high-boiling polar solvents (such as esters and ketones) and high-boiling aromatic hydrocarbons. In contrast, the isocyanates are preferably dissolved or placed in high-boiling aromatic hydrocarbons.

U.S. Pat. No. 6,883,587 B2 describes binders that contain monomeric carbodiimides in the isocyanate component. These are used to improve moisture resistance. The structure of the monomeric carbodiimides is $R^1$—N=C=N—$R^2$, where $R^1$ and $R^2$ each denote hydrogen, alkyl, alkenyl, cycloalkyl, aryl, naphthyl, alkyl-substituted aryl, or aralkyl.

There is great interest in lowering emissions during the production of the core, core storage and casting in the molds. This is not only in the interest of protecting the environment and in the interest of occupational safety, but also so as to increase machine availability, for example during permanent mold casting, due to reduced condensate formation and therefore extended cleaning intervals. So as to reduce emission loads during production of the core or mold, drying of the core or mold, and casting in molds and cores, it is desirable to reduce the amount of material that can be pyrolized, which is to say the binder that is applied, while nonetheless preserving the required properties.

In terms of strength, attention must be paid in particular to sufficient initial strengths, in particular if integral molds are to be assembled into complex core packages immediately after production using (semi)automatic systems or are to be inserted into metallic permanent molds.

It was therefore the object of the invention to provide a mold material mixture, by way of which shaped bodies for the casting industry can be produced, which have lower emissions (condensates) as compared to shaped bodies that were produced using a mold material mixture that is provided with a conventional binder.

SUMMARY

This object was achieved by the embodiment according to claim 1 and the remaining independent claims. Advantageous embodiments are the subject matter of the dependent claims or are described hereafter.

The invention relates to a binder for mold material mixtures, comprising:
(A) one or more polyol compounds comprising at least 2 hydroxy groups per molecule, containing or consisting of at least one phenolic resin as the polyol compound, and
(B) one or more isocyanate compounds comprising at least 2 isocyanate groups per molecule, containing at least one isocyanate compound having at least 2 isocyanate groups per molecule, further comprising at least one uretonimine group or at least one carbodiimide group, or both, per molecule.

Surprisingly, it was found that the use of isocyanates comprising uretonimine and/or carbodiimide group(s) considerably reduces condensate formation. This result is achieved both in solvent-containing and in solvent-free isocyanate formulations.

The binder is preferably used in the form of a two- or multi-component system, comprising at least
(a) one polyol component, which is substantially free of isocyanate compounds and contains the polyol compound(s) (A), and
(b) an isocyanate component, which is substantially free of polyol compounds and contains the isocyanate compound(s) (B).

The invention further relates to mold material mixtures comprising refractory mold base materials and 0.2 to 5% by weight, preferably 0.3 to 4% by weight, particularly preferably 0.4 to 3% by weight, of the binder according to the invention, relative to the weight of the refractory mold base materials. Refractory mold base materials that can be employed include silica sand, zircon sand, chrome ore sand, olivine, chamotte and bauxite, for example. In addition, synthetically produced mold base materials may be used, such as aluminum silicate hollow spheres (known as microspheres), glass beads, glass granules or the spherical ceramic mold base materials known under the term "Cerabeads" or "Carbo Accucast". Mixtures of the refractory materials mentioned are likewise possible.

The refractory mold base materials are used in particular in the form of pourable powders.

The invention likewise relates to a method for producing a cured shaped body as a casting or core, comprising the following steps:

(a) mixing refractory mold base materials with the binder according to the invention in a binding quantity of 0.2 to 5% by weight binder, preferably 0.3 to 4% by weight, particularly preferably 0.4 to 3% by weight, relative to the amount of refractory mold base materials as a mold material mixture;

(b) introducing the mold material mixture obtained in step (a) in a shaping tool;

(c) curing the mold material mixture in the shaping tool, optionally by adding a catalyst, so as to obtain an integral mold; and (d) subsequently separating the cured mold from the tool and optionally curing the same further, whereby a hard, rigid, cured casting is obtained.

The polyol component comprises in particular phenol aldehyde resins, or consists thereof, which in the present invention are referred to as phenolic resins in short. All conventionally used phenol compounds are suitable for producing the phenolic resins. In addition to unsubstituted phenols, substituted phenols or mixtures thereof may be used. The phenol compounds are preferably substituted at both ortho positions, or at one ortho position and at the para position. Any remaining carbon atoms of the ring can be substituted. The selection of the substituent is not particularly limited, provided the substituent does not adversely affect the reaction of phenol with aldehyde. Examples of substituted phenols include alkyl-substituted, alkoxy-substituted, aryl-substituted and aryloxy-substituted phenols.

For example, the substituents mentioned above have 1 to 26, preferably 1 to 15, carbon atoms. Examples of suitable phenols include o-cresol, m-cresol, p-cresol, 3,5-xylenol, 3,4-xylenol, 3,4,5-trimethylphenol, 3-ethylphenol, 3,5-diethylphenol, p-butylphenol, 3,5-dibutylphenol, p-amylphenol, cyclohexylphenol, p-octylphenol, p-nonylphenol, cardanol, 3,5-dicyclohexylphenol, p-crotylphenol, p-phenylphenol, 3,5-dimethoxyphenol and p-phenoxyphenol. Phenol itself is particularly preferred. Products obtained by higher condensation of phenol, such as bisphenol A, are also suitable. In addition, polyvalent phenols comprising more than one phenolic hydroxyl group are also suited. Preferred polyvalent phenols have 2 to 4 phenolic hydroxyl groups. Specific examples of suitable polyvalent phenols include catechol, resorcinol, hydroquinone, pyrogallol, phloroglucinol, 2,5-dimethyl resorcinol, 4,5-dimethyl resorcinol, 5-methyl resorcinol, or 5-ethyl resorcinol. It is also possible to use mixtures of various monovalent and polyvalent and/or substituted and/or condensed phenol components for producing the polyol component.

In one embodiment, phenols of the general formula I:

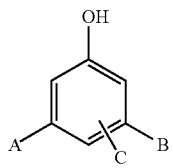

are used to produce the phenolic resins, where A, B and C independently from each other are selected from: a hydrogen atom, a branched or unbranched alkyl radical, which can comprise 1 to 26, preferably 1 to 15, carbon atoms, for example, a branched or unbranched alkoxy radical, which can comprise 1 to 26, preferably 1 to 15, carbon atoms, for example, a branched or unbranched alkenoxy radical, which can comprise 1 to 26, preferably 1 to 15 carbon atoms, for example, or an aryl or alkylaryl group, such as bisphenyls, for example.

Aldehydes that are suitable for producing the phenolic resins include aldehydes of the formula:

where R denotes a hydrogen atom or a hydrocarbon radical, preferably comprising 1 to 8, particularly preferably 1 to 3 carbon atoms. Specific examples include formaldehyde, acetaldehyde, propionaldehyde, furfurylaldehyde and benzaldehyde. Formaldehyde is particularly preferred, either in the aqueous form thereof, as paraformaldehyde or trioxane.

So as to obtain phenolic resins, an at least equivalent amount of aldehyde is used relative to the amount of the phenol component. The mol ratio of aldehyde to phenol is preferably 1:1.0 to 2.5:1, particularly preferably 1.1:1 to 2.2:1, still more preferably 1.2:1 to 2.0:1.

The phenolic resin is produced according to the method known to a person skilled in the art. The phenol and aldehyde are reacted under substantially anhydrous conditions, in particular in the presence of a divalent metal ion, at temperatures of preferably less than 130° C. The resulting water is distilled off. To this end, a suitable entrainer, for example toluene or xylene, can be added to the reaction mixture, or the distillation is carried out at reduced pressure.

The phenolic resin (polyol component) is selected so that cross-linking with the isocyanate component is possible. Phenolic resins, which comprise molecules having at least two hydroxyl groups (notably more than two) in the molecule, are necessary for creating a network.

Particularly suitable phenolic resins are known by the term "ortho-ortho" or "high-ortho" novolacs or benzyl ether resins. These can be obtained by condensing phenols with aldehyde in a weakly acidic environment using suitable catalysts. Salts of bivalent ions of metals such as Mn, Zn, Cd, Mg, Co, Ni, Fe, Pb, Ca and Ba are catalysts that are suitable for producing benzyl ether resins. Zinc acetate is preferred. The amount that is used is not critical. Typical amounts of metal catalyst are 0.02 to 0.3% by weight, preferably 0.02 to 0.15% by weight, relative to the total amount of phenol and aldehyde.

Such phenolic resins are described, for example, in U.S. Pat. No. 3,485,797 and EP 1137500 B1, the disclosure of which is hereby explicitly included by reference, both with regard to the resins themselves and with regard to the production thereof.

The phenolic resin component of the binder is preferably used as a solution in an organic solvent or in a combination of organic solvents. Solvents may therefore be required, for example, so as to maintain the components of the binder in a sufficient low-viscosity state. This may be required, among other things, so as to obtain uniform cross-linking of the refractory mold base material and the pourability thereof.

The polyisocyanate component of the binder according to the invention comprises:
- at least one aliphatic, cycloaliphatic or aromatic isocyanate, the functionality of which is of at least 2.0 and which contains at least one uretonimine and/or carbodiimide group,
- optionally additionally one or more aliphatic, cycloaliphatic or aromatic polyisocyanate compound, preferably comprising 2 to 5 isocyanate groups that are free of uretonimine and carbodiimide groups, and
- optionally solvents.

Suitable polyisocyanates comprise aliphatic polyisocyanates, such as hexamethylene diisocyanate, alicyclic polyisocyanates such as 4,4'-dicyclohexylmethane diisocyanate and dimethyl derivatives thereof. Examples of suitable aromatic polyisocyanates include toluene-2,4-diisocyanate, toluene-2,6-diisocyanate, 1,5-naphthalene diisocyanate, triphenylmethane triisocyanate, xylylene diisocyanate and methyl derivatives thereof, as well as polymethylene polyphenylisocyanates.

Polyisocyanates comprising aromatic groups are particularly preferred, still more preferred are polymethylene polyphenyl polyisocyanates such as technical 4,4'-diphenylmethane diisocyanate, which is to say 4,4'-diphenylmethane diisocyanate comprising some isomers (for example, 2,4) and higher homologs.

The carbodiimide-modified and/or uretonimine-containing isocyanates used according to the invention can, for example, be obtained by a catalytic reaction of isocyanate groups to form a carbodiimide group. This group can (in part) react further with additional isocyanate groups to obtain a uretonimine group. For this purpose, two diisocyanates are reacted with two isocyanate groups to form carbodiimide, for example. A uretonimine group forms when another diisocyanate is added.

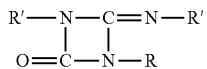

Suitable modified isocyanates are uretonimine- and/or carbodiimide-modified 4,4'-diphenylmethane diisocyanates. However, other isocyanates are also suited. Typical commercial products include Lupranat MM 103, from BASF Polyurethans (carbodiimide-modified 4,4'-diphenylmethane diisocyanate) or Suprasec 4102, from Huntsmann (uretonimine-modified MDI). These contain 10 to 35% by weight uretonimine- and/or carbodiimide-modified isocyanate compounds.

By inserting the uretonimine and/or carbodiimide group, the low temperature stability is lowered or improved.

The isocyanate component can comprise 0.2 to 35% by weight, preferably between 2 and 35% by weight, uretonimine- and/or carbodiimide-modified isocyanate compounds. According to one embodiment, the subject matter of the invention is thus a diisocyanate or polyisocyanate compound as the isocyanate component, of which a respective NCO group is converted into a carbodiimide group by reacting two molecules of diisocyanate or polyisocyanate, and/or the carbodiimide group in turn is converted into a uretonimine group by further reaction with an isocyanate group of a further diisocyanate or polyisocyanate molecule. The reaction products in turn, however, still comprise at least two unreacted isocyanate groups per molecule, and in the case of the uretonimine group in particular at least three unreacted isocyanate groups. The diisocyanate or polyisocyanate compound is in particular appropriately modified diphenylmethane diisocyanate.

The modified isocyanates are preferably used in an isocyanate component with less than 40% by weight solvent, preferably with less than 20% by weight solvent, in particular less than 10% by weight solvent, or no solvent at all. However, applications using higher amounts of solvent are also possible.

In general, 10 to 500% by weight isocyanate component is used, preferably 45 to 300% by weight, relative to the weight of the polyol component.

The isocyanate compounds, comprising the modified isocyanates, are preferably used in a quantity so that the number of isocyanate groups is 80 to 120%, relative to the number of free hydroxyl groups of the resin.

In addition to aromatic solvents, oxygen-rich polar organic solvents can be used as for the polyol compound, in particular for the phenolic resin. Especially dicarboxylic acid esters, glycol ether esters, glycol diesters, glycol diethers, cyclic ketones, cyclic esters (lactones), cyclic carbonates or silicic acid esters are suited. Dicarboxylic acid esters, cyclic ketones and cyclic carbonates are preferred.

Dicarboxylic acid esters have the formula $R_1OOC$—$R_2$—$COOR_1$, where, independently of each other, $R_1$ denotes an alkyl group having 1 to 12 (preferably 1 to 6) carbon atoms, and $R_2$ is an alkylene group having 1 to 4 carbon atoms. Examples include dimethyl esters of carboxylic acids containing 4 to 6 carbon atoms, which are available from DuPont, for example, by the name dibasic esters. Glycol ether esters are compounds of the formula $R_3$—O—$R_4$—$OOCR_5$, where $R_3$ denotes an alkyl group having 1 to 4 carbon atoms, $R_4$ is an alkylene group having 2 to 4 carbon atoms, and $R_5$ is an alkyl group having 1 to 3 carbon atoms (for example butyl glycolacetate), with glycol etheracetates being preferred. Glycol diesters accordingly have the general formula $R_3COO$—$R_4$—$OOCR_5$, where $R_3$ to $R_5$ are as defined above, and the remaining groups are selected independently of each other (for example propyleneglycol diacetate). Glycol diacetates are preferred.

Glycol diethers can be characterized by the formula $R_3O$—$R_4$—O—$R_5$, where $R_3$ to $R_5$ are as defined above, and the remaining groups are selected independently of each other (for example dipropyleneglycol dimethyl ether).

Cyclic ketones, cyclic esters and cyclic carbonates having 4 to 5 carbon atoms are likewise suited (for example, propylene carbonate). The respective alkyl and alkylene groups can be branched or unbranched.

Fatty acid esters, such as rapeseed oil fatty acid methyl esters or oleic acid butyl esters, are also suited.

Moreover, softeners/plasticizers may be employed so as to improve mold or core flexibility. So as to prevent compounds from leaving the mold material mixture or the core before the casting process, low-volatility compounds are used, which generally have a boiling point of >250° C. at 25° C. The softeners that may be used include, for example, phthalates (see U.S. Pat. No. 3,905,934), citrates, adipates, trimellitates, azelates, dicarboxylic acids and the esters thereof. Fatty acid esters can also have softening properties.

In addition to the afore-mentioned ingredients, the binders can contain additives, for example silanes (such as according to EP 1137500 B1) or internal release agents, for example fatty alcohols (such as according to U.S. Pat. No. 4,602,069), drying oils (such as according to U.S. Pat. No. 4,268,425) or complexing agents (such as according to U.S. Pat. No. 5,447,968), or mixtures thereof.

For example, suitable silanes include aminosilanes, epoxysilanes, mercaptosilanes, hydroxysilanes and ureidosilanes, such as γ-hydroxypropyl trimethoxysilane, γ-aminopropyl trimethoxysilane, 3-ureidopropyl triethoxysilane, γ-mercaptopropyl trimethoxysilane, γ-glycidoxypropyl trimethoxysilane, β-(3,4-epoxycyclohexyl)trimethoxysilane and N-β-(aminoethyl)-γ-aminopropyl trimethoxysilane.

So as to produce the mold material mixture, the components of the binder can be combined first and then added to the refractory mold base material. However, it is also possible to add the components of the binder simultaneously or successively to the refractory mold base material. Customary methods can be employed to achieve uniform mixing of the components in the mold material mixture. In addition, the mold material mixture can optionally comprise other conventional ingredients, such as iron oxide, ground flax fibers, wood dust granules, pitch and refractory metals.

The invention further relates to a method for producing a shaped body, comprising the following steps:
providing the above-described mold material mixture:
shaping the mold material mixture to obtain a shaped body;
curing the shaped body by adding a curing catalyst.

So as to produce the shaped body, first the binder is mixed with the refractory mold base material to obtain a mold material mixture, as described above. If the shaped body is to be produced according the Phenolic Urethane No Bake method, a suitable catalyst can also already be added the mold material mixture. For this purpose, liquid amines are preferably added to the mold material mixture. These amines preferably have $pK_b$ values of 4 to 11. Examples of suitable catalysts include 4-alkylpyridines, wherein the alkyl group comprises 1 to 4 carbon atoms, isoquinoline, arylpyridines, such as phenylpyridine, pyridine, acryline, 2-methoxypyridine, pyridazine, quinoline, n-methylimidazole, 4,4'-dipyridine, phenylpropylpyridine, 1-methylbenzimidazole, 1,4-thiazine, N,N-dimethylbenzylamine, triethylamine, tribenzylamine, N,N-dimethyl-1,3-propanediamine, N,N-dimethylethanolamine as well as triethanolamine. The catalyst can optionally be diluted with an inert solvent, for example 2,2,4-trimethyl-1,3-pentanediol-diisobutyrate, or a fatty acid ester. The amount of catalyst that is added is selected in the range of 0.1 to 15% by weight, relative to the weight of the polyol component.

The mold material mixture is then introduced into the mold using customary means and is compacted there. The mold material mixture is then cured to form a shaped body. During curing, the shaped body should preferably maintain the outer shape thereof.

According to a further preferred embodiment, curing takes place according to the PU Cold Box method. For this purpose, a gaseous catalyst is conducted through the shaped mold material mixture. Customary catalysts from the field of the Cold Box process can be used as the catalyst. Amines are used particularly preferably as catalysts, still more preferably dimethylethylamine, dimethyl-n-propylamine, dimethylisopropylamine, dimethyl-n-butylamine, triethylamine and trimethylamine in the gaseous forms thereof or as aerosols. The shaped body produced by way of the method can generally have any shape that is customary in the foundry field. In a preferred embodiment, the shaped body is present in the form of casting molds or cores.

Moreover, the invention relates a shaped body, as that which can be obtained by the method described above. This body is characterized by high mechanical stability, improved moisture resistance, low smoke development and low condensate formation during metal casting. The invention further relates to the use of this shaped body for metal casting, in particular for iron and aluminum casting. The invention will be described in more detail hereafter based on preferred embodiments.

DETAILED DESCRIPTION

Test Examples

Successively, 0.6% by weight of Avecure AL 301 (commercial product of Ashland-Südchemie-Kernfest GmbH) and of the isocyanate component (part 2), respectively, are added to 100 parts by weight silica sand H 32 (Quarzwerke Frechen), and mixed intensively in a laboratory mixer (Vogel and Schemmann AG) for 2 minutes. Thereafter, the mold material mixtures were transferred into the storage container of a core shooter (Röperwerke Gießereimaschinen GmbH) and introduced into the shaping tool by way of compressed air (4 bar). The shaped body was cured by gassing with 1 ml triethylamine (2 seconds, 2 bar pressure, then rinsing with air for 10 seconds).

The following polyisocyanate (polymeric MDI) solutions were produced (each in parts by weight or percent by weight):

TABLE 1

|  | not according to the invention | |
| --- | --- | --- |
| Part 2: | V1 | V2 |
| PMDI | 80 | 100 |
| Solvent naphtha light | 20 | |
|  | according to the invention | |
|  | E1 | E2 |
| Lupranat MM 103 | 100 | |
| Suprasec 4102 | | 100 |

|  | E3 | E4 | E5 | E6 |
| --- | --- | --- | --- | --- |
| Suprasec 4102 | 80 | 60 | 40 | 20 |
| Solvent naphtha light | 20 | 20 | 20 | 20 |
| PMDI | | 20 | 40 | 60 |

Production of Test Bars and Determination of the Flexural Strengths Using the Polyurethane Cold Box Method The test bodies that are produced are cuboid test bars having the dimensions 220 mm×22.36 mm×22.36 mm, referred to as Georg Fischer test bars. So as to determine the flexural strength, the test bars were inserted into a Georg Fischer strength testing system, equipped with a three-point bending device (Simpson Technologies GmbH) and the force that resulted in breakage of the test bars was measured.

Cogas method: The Cogas system is used to simulate the casting of a foundry core, while measuring the resulting amount of condensate and gas during the casting process with liquid aluminum.

During the casting process of sand cores bound with organic binders, the binder is thermally loaded with liquid aluminum (temperature range approximately 720° C.), wherein the ingredients thereof evaporate (for example highly volatile solvents) or crack (for example low-volatility solvents and resin constituents). The Cogas system is used to simulate such an aluminum casting process under standardized conditions, and the resulting condensates are collected during the first 5 minutes after immersion into a cold trap.

The tables below list the flexural strengths and condensate amounts according to the Cogas process:

TABLE 2

|  | not according to the invention | | |
| --- | --- | --- | --- |
| Added amount of Part 2: | 0.60% | 0.60% | 0.48% |
| Strengths N/cm² | V1 | V2 | V2 |
| immediately 10" | 180 | 150 | 130 |
| immediately 30" | 210 | 190 | 175 |
| 0.5 hour | 330 | 335 | 270 |
| 1 hour | 340 | 360 | 295 |
| 2 hours | 340 | 370 | 275 |

TABLE 2-continued

|  | not according to the invention | | |
|---|---|---|---|
| Added amount of Part 2: | 0.60% | 0.60% | 0.48% |
| Strengths N/cm² | V1 | V2 | V2 |
| 24 hours | 390 | 355 | 275 |
| Condensate formation (mg/100 g core) | 488 | 508 | 463 |
| Example | 1 | 2 | 3 |

TABLE 3

|  | according to the invention | | | | |
|---|---|---|---|---|---|
| Added amount of Part 2: | 0.55% | 0.50% | 0.45% | 0.40% | 0.35% |
| Strengths N/cm² | E1 | E1 | E1 | E1 | E1 |
| immediately 10" | 145 | 165 | 175 | 180 | 185 |
| immediately 30" | 220 | 225 | 235 | 235 | 235 |
| 0.5 hour | 415 | 385 | 350 | 320 | 285 |
| 1 hour | 425 | 390 | 365 | 345 | 290 |
| 2 hours | 430 | 405 | 380 | 365 | 305 |
| 24 hours | 445 | 425 | 405 | 375 | 335 |
| Example | 4 | 5 | 6 | 7 | 8 |

TABLE 4

|  | according to the invention | | | |
|---|---|---|---|---|
| Added amount of Part 2: | 0.60% | 0.60% | 0.48% | 0.48% |
| Strengths N/cm² | E1 | E2 | E1 | E2 |
| immediately 10" | 125 | 115 | 180 | 175 |
| immediately 30" | 215 | 175 | 230 | 250 |
| 0.5 hour | 430 | 380 | 325 | 365 |
| 1 hour | 455 | 425 | 350 | 320 |
| 2 hours | 505 | 435 | 345 | 360 |
| 24 hours | 450 | 480 | 400 | 380 |
| Condensate formation (mg/100 g core) | 460 | 367 | 432 | 329 |
| Example | 9 | 10 | 11 | 12 |

TABLE 5

|  | according to the invention | | | |
|---|---|---|---|---|
| Added amount of Part 2: | 0.60% | 0.60% | 0.60% | 0.60% |
| Strengths N/cm² | E3 | E4 | E5 | E6 |
| immediately 10" | 190 | 180 | 190 | 180 |
| immediately 30" | 220 | 220 | 230 | 220 |
| 0.5 hour | 340 | 350 | 350 | 330 |
| 1 hour | 360 | 350 | 360 | 350 |
| 2 hours | 380 | 360 | 380 | 370 |
| 24 hours | 450 | 450 | 480 | 450 |
| Condensate formation (mg/100 g core) | 375 | 399 | 415 | 238 |
| Example | 13 | 14 | 15 | 16 |

Examples 1 to 3 show the strength curves of cores that were produced with one part 2 consisting exclusively of MDI. As the added amount of part 2 increases, the final strengths increase as expected. However, surprisingly the initial strengths (Examples 4 to 8) increase as the added amount of uretonimine- and/or carbodiimide-modified isocyanate decreases.

Examples 1 to 3 and 9 to 12 show the direct comparison between uretonimine-modified and unmodified MDI. This shows that the replacement of solvent-containing part 2 with the same amount of uretonimine- and/or carbodiimide-modified MDI (Examples 1, 9 & 10) leads to a worse result only for the initial strengths. The final strengths are considerably improved, and the amount of condensate that develops in the Cogas is reduced. The same result is obtained when comparing the use of solvent-free, unmodified MDI as part 2 and modified MDI (Examples 2, 9 & 10).

If only the amount of MDI that is already present in the solvent-containing part 2 is used as part 2, it is apparent that the carbodiimide- and/or uretonimine-modified MDI offers clear advantages (Examples 3, 11 & 12). The strength profile is considerably higher, and the condensate formation exhibits a clear reduction when using the uretonimine- and/or carbodiimide-modified MDIs.

The comparison of a standard mixture with solvent-containing part 2 and the uretonimine- and/or carbodiimide-modified MDI that have been adjusted in terms of quantity (Examples 1, 11 & 12) shows clear advantages of the latter system:
- comparable strength profile as the addition of binder is reduced
- considerably reduced condensate formation (up to −30%).

For the mixtures, the results of which are shown in Table 5, a carbodiimide- and/or uretonimine-modified isocyanate was diluted with 20% solvent (E3) and then incrementally replaced with technical 4,4'-MDI (E4 to E6). It is apparent how the resulting amount of condensate decreases between Example 13 and to Example 16, while the strength properties become nearly even.

The invention claimed is:

1. A binder for mold material mixtures, comprising:
   (A) one or more polyol compounds comprising at least 2 hydroxy groups per molecule, containing at least one phenolic resin as the polyol compound; and
   (B) one or more isocyanate compounds comprising per molecule, at least 2 isocyanate groups and at least one of: a uretonimine group and a carbodiimide group.

2. The binder according to claim 1 in the form of a two- or multi-component system, comprising:
   (a) a polyol component, which is free of isocyanate compounds and contains the polyol compound(s) (A); and
   (b) an isocyanate compound, which is free of polyol compounds and contains the isocyanate compound(s) (B).

3. The binder according to claim 1, further comprising at least one additional ingredient from the group consisting of: solvents, plasticizers and additives.

4. The binder according to claim 2, further comprising: a solvent, in at least one of: component (a) and component (b).

5. A binder according to claim 2, wherein the isocyanate component at least comprises:
   more than 1.0% by weight isocyanate compounds comprising per molecule at least 2 isocyanate groups and at least one of: a uretonimine group and a carbodiimide group.

6. A binder according to claim 2, wherein the isocyanate component optionally comprises solvent, in an amount up to 40% by weight.

7. A binder according to claim 1, further comprising one or more isocyanate compounds having in the range of from two to five isocyanate groups, the isocyanate compounds being free of both uretonimine groups and carbodiimide groups.

8. A binder according to claim 1, wherein the isocyanate compounds (B) comprise aromatic diisocyanates or polyisocyanates.

9. A binder according to claim 1, wherein the phenolic resin is obtained by reacting a phenol compound with an aldehyde compound in an acid medium using a transition metal catalyst.

10. The binder according to claim 9, wherein the catalyst is a zinc compound.

11. A binder according to claim 1, wherein the phenolic resin is a benzyl ether resin.

12. The binder according to claim 9, wherein the phenol compound is selected from one or more members of the following group: phenol, o-cresol, p-cresol, bisphenol A or cardanol.

13. The binder according to claim 9, wherein the aldehyde compound is an aldehyde of the formula:

R—CHO, where R denotes a hydrogen atom or a carbon group having 1 to 8 carbon atoms.

14. A binder according to claim 1, comprising relative to the binder:
   8 to 70% by weight polyol compounds or the reaction products thereof;
   13 to 78% by weight isocyanate compounds or the reaction products thereof; and
   2 to 57% by weight solvent.

15. The binder according to claim 2, wherein components (a) and (b) are present in the binder in a weight ratio of 0.8 to 1.2 to 1.2 to 0.8.

16. A mold material mixture, comprising as the binder:
   (A) one or more polyol compounds comprising at least 2 hydroxy groups per molecule;
   (B) one or more isocyanate compounds comprising per molecule, at least 2 isocyanate groups and at least one of: a uretonimine group and a carbodiimide group; and
   (C) refractory mold base materials.

17. The mold material mixture according to claim 16, wherein the refractory mold base material is selected from the group consisting of: olivine, chamotte, bauxite, aluminum silicate hollow spheres, glass beads, glass granules, synthetic ceramic mold base materials, silica sand, zirconium sand, chrome ore sand and mixtures thereof.

18. A method for producing a shaped body as a casting mold or as a core, comprising:
   (i) mixing refractory mold base materials with a binder, comprising:
      (A) one or more polyol compounds comprising at least 2 hydroxy groups per molecule; and
      (B) one or more isocyanate compounds comprising per molecule, at least 2 isocyanate groups and at least one of: a uretonimine group and a carbodiimide group, in a binding quantity of 0.2 to 5% by weight, relative to the amount of refractory mold base material, so as to obtain a mold material mixture;
   (ii) introducing the mold material mixture or the ingredients thereof into a shaping tool;
   (iii) curing the mold material mixture in the shaping tool so as to obtain an integral mold; and
   (iv) subsequently separating the cured mold from the tool and optionally curing the same further, whereby a cured shaped body is obtained.

19. The method according to claim 18, wherein the curing step is achieved using a material, in a gaseous or aerosol form, the material selected from the group consisting of: dimethylethylamine, dimethyl-n-propylamine, dimethylisopropylamine, dimethyl-n-butylamine, triethylamine, trimethylamine, and mixtures thereof.

20. The method according to claim 18, wherein a liquid catalyst is used for curing, in particular phenylpropylpyridine.

* * * * *